US011158882B2

(12) United States Patent
Leblanc et al.

(10) Patent No.: US 11,158,882 B2
(45) Date of Patent: Oct. 26, 2021

(54) LITHUM METAL BATTERY

(71) Applicant: BLUE SOLUTIONS CANADA INC., Boucherville (CA)

(72) Inventors: Patrick Leblanc, Boucherville (CA); Frederic Cotton, Montreal (CA); Alain Vallee, Varennes (CA); Cedric Reboul-Salze, Montreal (CA)

(73) Assignee: BLUE SOLUTIONS CANADA INC., Boucherville (CA)

( * ) Notice: Subject to any disclaimer, the term of this patent is extended or adjusted under 35 U.S.C. 154(b) by 0 days.

(21) Appl. No.: 16/863,013

(22) Filed: Apr. 30, 2020

(65) Prior Publication Data
US 2020/0328473 A1    Oct. 15, 2020

Related U.S. Application Data

(62) Division of application No. 15/833,951, filed on Dec. 6, 2017, now Pat. No. 10,680,283.
(Continued)

(51) Int. Cl.
*H01M 10/056* (2010.01)
*H01M 10/0525* (2010.01)
(Continued)

(52) U.S. Cl.
CPC ....... *H01M 10/0567* (2013.01); *H01M 4/134* (2013.01); *H01M 4/382* (2013.01); *H01M 10/052* (2013.01); *H01M 10/056* (2013.01); *H01M 10/0525* (2013.01); *H01M 10/0565* (2013.01); *H01M 10/0568* (2013.01); *H01M 10/0569* (2013.01); *H01M 10/4235* (2013.01); *H01M 50/411* (2021.01); *H01M 50/449* (2021.01); *H01M 50/451* (2021.01); *H01M 50/46* (2021.01); *H01M 2300/0025* (2013.01)

(58) Field of Classification Search
None
See application file for complete search history.

(56) References Cited

U.S. PATENT DOCUMENTS

| 6,361,901 B1 | 3/2002 | Mayes et al. |
| 2008/0045615 A1 | 2/2008 | Best |

(Continued)

FOREIGN PATENT DOCUMENTS

| CN | 103367799 | 10/2013 |
| CN | 103956450 A | 7/2014 |

(Continued)

OTHER PUBLICATIONS

Arora, P. et al., Battery Separators, Chem. Rev. 2004, 104, 4419-4462.
(Continued)

*Primary Examiner* — Basia A Ridley
*Assistant Examiner* — Heng M. Chan
(74) *Attorney, Agent, or Firm* — BCF LLP

(57) ABSTRACT

A lithium metal battery is disclosed. The lithium battery comprising a Li metal anode, a cathode and an electrolyte in between the Li metal anode and the cathode wherein the electrolyte includes immobilized anions at least at the interface between the Li metal anode and the electrolyte to maintain the anionic concentration at the interface above zero throughout the charge-discharge cycles thereby preventing surface potential instability at the interface of the Li metal anode and electrolyte.

8 Claims, 2 Drawing Sheets

Related U.S. Application Data

(60) Provisional application No. 62/434,192, filed on Dec. 14, 2016.

(51) Int. Cl.

| | | |
|---|---|---|
| *H01M 4/38* | (2006.01) | |
| *H01M 4/134* | (2010.01) | |
| *H01M 10/42* | (2006.01) | |
| *H01M 10/0568* | (2010.01) | |
| *H01M 10/0569* | (2010.01) | |
| *H01M 10/052* | (2010.01) | |
| *H01M 50/46* | (2021.01) | |
| *H01M 50/411* | (2021.01) | |
| *H01M 50/449* | (2021.01) | |
| *H01M 10/0567* | (2010.01) | |
| *H01M 10/0565* | (2010.01) | |
| *H01M 50/451* | (2021.01) | |

(56) References Cited

U.S. PATENT DOCUMENTS

| | | |
|---|---|---|
| 2014/0272600 A1 | 9/2014 | Bouchet et al. |
| 2015/0188189 A1 | 7/2015 | Armand et al. |
| 2015/0218313 A1 | 8/2015 | Wang et al. |
| 2016/0093913 A1 | 3/2016 | Saito |
| 2016/0190534 A1 | 6/2016 | Kimura et al. |

FOREIGN PATENT DOCUMENTS

| | | |
|---|---|---|
| EP | 3539178 A1 | 9/2019 |
| KR | 102003060165 | 10/2009 |
| WO | 2014185344 A1 | 11/2014 |
| WO | 2016012670 A1 | 1/2016 |

OTHER PUBLICATIONS

Li et al., "The MMA and SO3Li-grafted polypropylene separator used in Li ion batteries", Ionics, vol. 18, p. 673-677, 2012.

Lu et al., "Ionic-Liquid-Nanoparticle Hybrid Electrolytes: Applications in Lithium Metal Batteries", Angew. Chem. Int. Ed., vol. 53, p. 488-492, 2014.

Tu et al., "Nanostructured Electrolytes for Stable Lithium Electrodeposition in Secondary Batteries", Accounts of Chemical Research, vol. 48, p. 2947-2956, 2015.

English translation of the abstract of CN 103367799.

International Search Report and Written Opinion issued in corresponding International application No. PCT/CA2017/000260 dated Mar. 12, 2018.

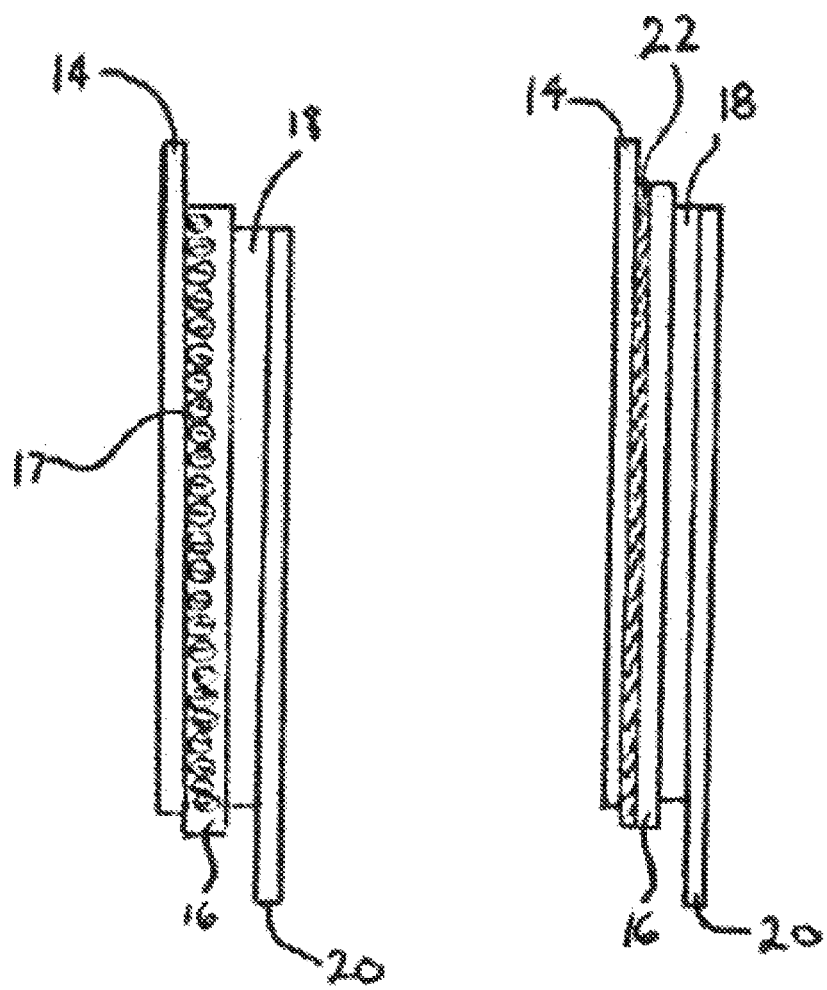

LITHUM METAL BATTERY

CROSS-REFERENCE TO RELATED APPLICATION

The present patent application is a divisional of patent application Ser. No. 15/833,951, filed on Dec. 6, 2017 and now U.S. Pat. No. 10,680,283, which claims the benefits and priority to U.S. Patent Application No. 62/434,192, the content of all of which is incorporated herein by reference.

FIELD OF THE INVENTION

The present invention relates to lithium metal batteries and more specifically to a lithium metal battery configuration that inhibits the formation and growth of dendrite on the surface of the lithium metal electrode.

BACKGROUND OF THE INVENTION

A lithium battery using a lithium metal as a negative electrode has excellent energy density. However, with repeated cycles, such a battery can be subject to dendrites' growths on the surface of the lithium metal electrode when recharging the battery as the lithium ions are unevenly re-plated on surface of the lithium metal electrode. To minimize the effect of the morphological evolution of the surface of the lithium metal anode including dendrites growth, a lithium metal battery typically uses a mechanical system that applies pressure onto the multiple laminates of the electrochemical cells, each laminate of the electrochemical cells including a solid polymer electrolyte having sufficient mechanical strength to withstand the applied pressure as described in U.S. Pat. No. 6,007,935 which is herein incorporated by reference. The mechanical strength and shear modulus of the solid polymer electrolyte combined with mechanical pressure applied onto the lithium metal electrode is believed to inhibit the growth of dendrite on the surface of the lithium metal electrode or at least substantially reduce the dendrite growth velocity over hundreds of charge-discharge cycle such that a lithium battery using a lithium metal anode may have a long service life. However, dendrites may eventually form on the surface of the lithium metal anode and may still grow to penetrate the electrolyte, even though the electrolyte is solid and proven to be an effective barrier against perforation of dendrites. Dendrites' growth may ultimately cause 'soft' short circuits between the negative electrode and the positive electrode, resulting in decreasing or poor performance of the battery. The growth of dendrites may still limit the cycling characteristics of a solid polymer electrolyte battery and therefore still constitutes an important obstacle with respect to the optimization of the performances of lithium batteries having a metallic lithium anode.

The Li dendrite growth during the Li deposition process or re-plating on the surface of the Li metal anode which occurs when the electrochemical cell is recharged has been extensively studied over the years in order to reveal the mechanisms of dendrite formation and the growth processes in an effort to find approaches to suppress or prevent the dendrite formation. It was found that different dendrite morphologies are formed at different current densities during recharge. At low current density, needle-like and particle-like dendrites are observed whereas at higher current densities tree-like or bush-like dendrites are observed. The evolution of tree-like and needle-like dendrites being more problematic as the branches of the tree-like dendrites or the needles of the needle-like dendrites are more likely to perforate the solid polymer electrolyte as they grow to eventually contact the opposite positive electrode thereby causing a short circuit.

Other investigations revealed swelling and shrinking of the surface of the Li film during repeated Li deposition (charge) and Li stripping (discharge) causing cracks along the grain boundaries of the structure the Li film which become preferential locations on the surface for Li deposition and therefore dendrite formation and growth. Another study demonstrated that the bulk of the dendrite structure lay within the Li electrode, underneath the polymer electrolyte/Li electrode interface at the early stage of dendrite development and that crystalline impurities in the Li electrode were found at the base of the subsurface dendritic structure pointing to the importance of the purity of the lithium metal electrode.

It was also found that temperature and electrolyte composition strongly impact the Li deposition morphology leading to dendrite formation and growth.

Furthermore, it has been shown that when the electrolyte is polarized under high current density, $Li^+$ cations near the surface of the electrode are reduced to Li metal such that the $Li^+$ cation concentration decreases resulting in anion migrating toward the positive electrode until a new equilibrium is reached thereby depleting the surface of the Li metal electrode of anions in specific locations on the surface of the Li metal where the anionic concentration falls to zero resulting in instability at the interface of the Li electrode and electrolyte from erratic and inconsistent distribution of the surface potential, which creates localized electric field that leads to dendrite formation and growth due to preferential path for Li deposition.

Several models were conceived to explain the mechanisms of dendrite formation and the growth processes on the surface of a Li metal electrode; however no real solution has been provided to date to suppress or prevent the dendrite formation. Thus, there is a need for an electrochemical cell configuration including a Li metal electrode which is specifically adapted to suppress, prevent or strongly inhibit dendrite formation and growth on the surface of the Li metal electrode through repeated cycles of charge and discharge.

STATEMENT OF THE INVENTION

One aspect of the present invention is to provide a lithium battery comprising a Li metal anode, a cathode and an electrolyte in between the Li metal anode and the cathode wherein the electrolyte includes immobilized anions at least at the interface between the Li metal anode to maintain the anionic concentration at the interface above zero throughout the charge-discharge cycles thereby preventing surface potential instability at the interface of the Li metal anode and electrolyte.

In another aspect, the electrolyte comprises a layer of polymer grafted with immobilized anions is positioned at the interface between the Li metal anode and the electrolyte.

In another aspect, the electrolyte comprises a layer of ceramic grafted with immobilized anions is positioned at the interface between the Li metal anode and the electrolyte.

In another aspect, the electrolyte comprises a layer of nanocellulosic material grafted with immobilized anions is positioned at the interface between the Li metal anode and the electrolyte.

Another aspect of the invention is to provide a lithium battery comprising a Li metal anode, a cathode and an electrolyte in between the Li metal anode and the cathode wherein the entire electrolyte includes immobilized anions to maintain the anionic concentration at the interface above zero throughout the charge-discharge cycles thereby preventing surface potential instability at the interface of the Li metal anode and electrolyte.

In another aspect, the electrolyte includes immobilized anions grafted onto the components of the electrolyte to maintain the anionic concentration at the interface above zero throughout the charge-discharge cycle. The immobilized anions grafted may be grafted on a polymer component of the electrolyte, on a ceramic component of the electrolyte, on a nanocellulose component of the electrolyte, or on a membrane component of the electrolyte.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where:

FIG. 2 is a schematic representation illustrating the interface between the Li metal anode and the electrolyte including immobilized anions; and FIG. 3 is a schematic representation illustrating a layer containing immobilized anions positioned at the interface between the Li metal anode and the electrolyte.

DESCRIPTION OF PREFERRED EMBODIMENT(S)

Figure 1:
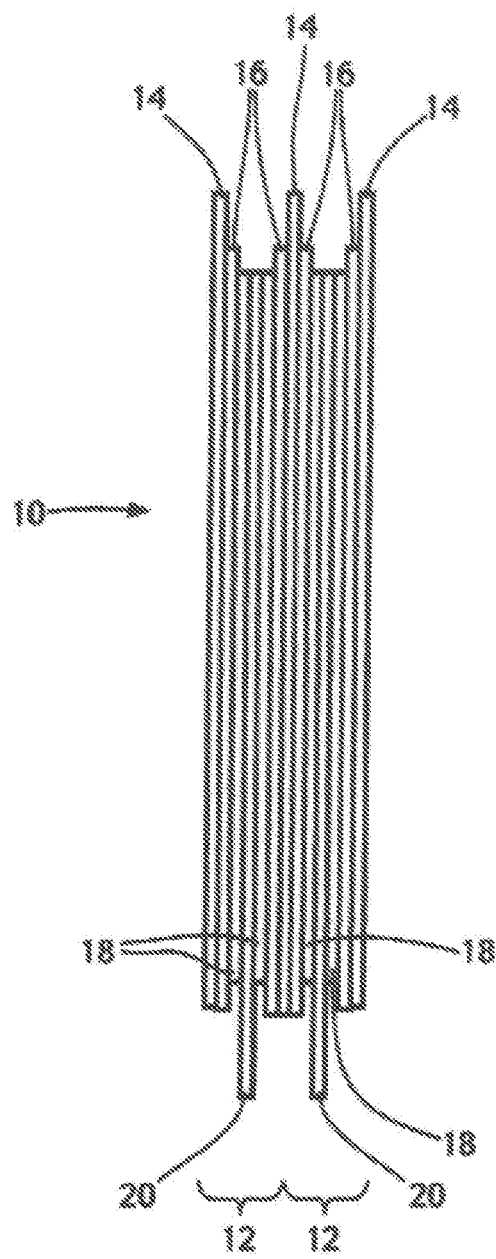
FIG. 1 is a schematic representation of a plurality of electrochemical cells forming a lithium metal polymer battery.

FIG. 1 illustrates schematically a lithium metal battery 10 having a plurality of electrochemical cells 12 each including a Li metal anode or negative electrode 14 made of a sheet of metallic lithium, an electrolyte 16 and a cathode or positive electrode film 18 layered onto a current collector 20. The electrolyte 16 typically includes a lithium salt to provide ionic conduction between the anode 14 and the cathode 18. The sheet of lithium metal typically has a thickness ranging from 20 microns to 100 microns; the electrolyte 16 has a thickness ranging from 10 microns to 50 microns, and the positive electrode film 18 typically has a thickness ranging from 20 microns to 100 microns.

The electrolyte 16 according to one embodiment of the invention is composed of at least one polymer and a lithium salt. The polymer having the ability to dissolve the lithium salt to form a conductive medium for lithium ions migrating between the anode 14 and the cathode 18 such as for example polymers of the polyether family which includes polyethylene oxide (PEO), polypropylene oxide (PPO), polybutylene oxide (PBO) and so on, and copolymers comprising or including one of these polymers. The polymer is preferably a polyethylene oxide (PEO) based polymer or copolymer. The polymer can be in a solid, or gel state in the electrolyte.

The lithium salt may be selected from $LiCF_3SO_3$, $LiB(C_2O_4)_2$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, $LiSCN$, $LiAsF_6$, $LiBOB$, $LiBF_4$, and $LiClO_4$.

The electrolyte 16 according to another embodiment of the invention is composed of a separator membrane and an electrolytic solution comprising an organic solvent and a lithium salt dissolved therein. The separator membrane can be a porous polymer sheet, a porous cellulose sheet or any other type of porous material in sheet form typically used for li-ion batteries. The organic solvent can include any suitable type that has been generally used for li-ion batteries. Examples of such organic solvents include propylene carbonate (PC), ethylene carbonate (EC), diethyl carbonate (DEC), dimethyl carbonate (DMC), 1,2-dimethoxyethane, 1,2-diethoxyethane, .gamma.-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. Lithium salts commonly used as a solute in the electrolytic solution include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $LiB_{10}Cl_{10}$, $Li_2B_{12}Cl_{12}$, $LiB(C_2O_4)_2$, $LiB(C_2O_4)F_2$, $LiCl$, $LiBr$, and the like.

With reference to FIG. 2, there is shown that the interface 17 between the Li metal anode 14 and the electrolyte 16 includes immobilized anions represented by (−). These immobilized anions remain fixed at or near the interface 17 to ensure that the anionic concentration never falls to zero at or near the surface of the Li metal anode 14 throughout the charge-discharge cycle of the lithium metal battery 10. As described above, when the electrolyte is polarized under high current density, anions migrate toward the positive electrode 18 thereby depleting the surface of the Li metal anode 14 of anions in specific locations on the surface of the Li metal anode 14 resulting in instability of the surface potential at the interface 17, which creates localized electric field that leads to dendrite formation and growth due to preferential path for Li deposition during charging. Immobilized anions were therefore permanently fixed at and near the surface of the Li metal anode 14 at the interface 17 to maintain the anionic concentration at the interface 17 above zero throughout the charge-discharge cycle in order to prevent instability of the surface potential of the Li metal anode 14 at the interface 17 thereby preventing the creation of localized electric field at the surface of the Li metal anode 14 which leads to dendrite formation and growth during Li deposition in the charging cycle of the lithium metal battery 10.

Immobilized anions may be added and fixed onto the surface of the Li metal anode 14 at the interface 17 by grafting anions onto the surface of the electrolyte 16 directly in contact with the surface of the Li metal anode 14 at the interface 17. Immobilized anions may also be grafted throughout the electrolyte 16 ensuring that immobilized anions are present at the interface 17 and in contact with the surface of the Li metal anode 14.

For polymer electrolytes, the grafted anions are preferably but not necessarily anions of the lithium salts previously described which are respectively $CF_3SO_3$, $B(C_2O_4)_2$, $N(CF_3SO_2)_2$, $C(CF_3SO_2)_3$, $C(CH_3)(CF_3SO_2)_2$, $CH(CF_3SO_2)_2$, $CH_2(CF_3SO_2)$, $C_2F_5SO_3$, $N(C_2F_5SO_2)_2$, $N(CF_3SO_2)$, $B(CF_3SO_2)_2$, $PF_6$, $SbF_6$, $ClO_4$, $SCN$, $AsF_6$, $BOB$, $BF_4$, and $ClO_4$. For electrolytes composed of a separator membrane and an electrolytic solution, the anions are grafted or otherwise immobilized onto or into the polymer, cellulose or porous component of the membrane itself. The grafted anions are preferably but not necessarily anions of the lithium salts previously described which are respectively $PF_6$, $BF_4$, $CF_3SO_3$, $N(CF_3SO_2)_2$, $N(C_2F_5SO_2)_2$, $N(CF_3SO_2)(C_4F_9SO_2)$, $C(CF_3SO_2)_3$, $C(C_2F_5SO_2)_3$, $AsF_6$, $ClO_4$, $B_{10}Cl_{10}$, $B_{12}Cl_{12}$, $B(C_2O_4)_2$, $B(C_2O_4)F_2$, Cl, Br, etc. In both types of electrolytes, other kinds of anion not related to lithium salts may also be grafted onto the components of the electrolyte without departing from the concept of the present invention.

Immobilized anions of these lithium salts (or other kinds) positioned at the interface 17 ensures that the anionic concentration at the interface 17 remains above zero throughout the charge cycle by avoiding depletion of anions on the surface of the Li metal anode 14 in various locations which in effect prevents instability of the surface potential at the surface of the Li metal anode 14 thereby preventing dendrite formation and growth during Li deposition in the charging cycle of the lithium metal battery 10. The immobilized grafted anions positioned at the interface 17 substantially reduce the formation of heterogeneous electrodeposits of lithium (including dendrites formation) during charging.

The grafted anions positioned at the interface 17 do not hinder ionic conduction between anode 14 and cathode 18 and the preferred grafted anions of lithium salts provide an additional ionic path for Li ions migrating from the Li metal anode 14 to the electrolyte 16. The grafted anions improve the electrochemical performance by increasing the number of Li ions transport.

With reference to FIG. 3, an additional layer of material 22 including immobilized anions is positioned between the Li metal anode 14 and the electrolyte 16 which acts as a protective barrier against dendrite formation and growth on the surface of the Li metal anode 14 by fixing immobilized anions (−) on and near the surface of the Li metal anode 14 such that the anionic concentration at the surface of the Li metal anode 14 never falls to zero and remains anionic throughout the charge-discharge cycle of the lithium metal battery 10. As previously described, the presence of immobilized anions positioned at the interface between the electrolyte 16 and the Li metal anode 14 ensures that the surface of the Li metal anode 14 is never depleted of anions in various locations and therefore prevents instability of the surface potential on the surface of the Li metal anode 14 thereby preventing dendrite formation and growth during Li deposition in the charging cycle of the lithium metal battery 10.

The additional layer of material 22 may be a layer of polymer grafted with immobilized anions, a layer of ceramic grafted with immobilized anions, a layer of nanocellulose grafted with immobilized anions of lithium salt or any other molecules capable of retaining immobilized anions or to which can be grafted anions.

In a further embodiment of the invention the entire electrolyte 16 may include immobilized anions in the form of grafted anions preferably of lithium salts to maintain the anionic concentration at the interface above zero. The entire electrolyte 16 including immobilized grafted anions also ensures that the anionic concentration at the interface 17 and at the surface of the Li metal anode 14 remains above zero and anionic by preventing the depletion of anions on the surface of the Li metal anode 14 and maintaining the interface 17 anionic throughout the charge-discharge cycles in order to prevent surface potential instability at the interface of the Li metal anode 14 and electrolyte 16 such that dendrite formation and growth during Li deposition in the charging cycle is eliminated or substantially reduced.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A lithium battery comprising a Li metal anode, a cathode and an electrolyte in between the Li metal anode and the cathode, wherein the electrolyte includes immobilized anions at least at the interface between the Li metal anode and the electrolyte to maintain the anionic concentration at the interface above zero throughout the charge-discharge cycles thereby preventing surface potential instability at the interface of the Li metal anode and electrolyte; wherein the electrolyte comprises a polymer layer and a ceramic layer both grafted with the immobilized anions.

2. The lithium battery as defined in claim 1, wherein the entire electrolyte includes immobilized anions.

3. The lithium battery as defined in claim 1, wherein the polymer is selected from the group consisting of polyethylene oxide (PEO), polypropylene oxide (PPO), polybutylene oxide (PBO) and copolymers comprising one of these polymers.

4. The lithium battery as defined in claim 1, wherein the polymer layer includes a separator membrane and an electrolytic solution comprising an organic solvent and a lithium salt dissolved therein.

5. The lithium battery as defined in claim 4, wherein the separator membrane is porous material in sheet form.

6. The lithium battery as defined in claim 5, wherein the porous material in sheet form is a porous polymer sheet.

7. The lithium battery as defined in claim 4, wherein the organic solvent is selected from the group consisting of propylene carbonate (PC), ethylene carbonate (EC), diethyl carbonate (DEC), dimethyl carbonate (DMC), 1,2-dimethoxyethane, 1,2-diethoxyethane, .gamma.-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, and propionate.

8. The lithium battery as defined in claim 4, wherein the lithium salt used as a solute in the electrolytic solution is selected from the group consisting of $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO4$, $LiB_{10}C_{10}$, $Li_2B_{12}Cl_{12}$, $LiB(C_2O_4)_2$, $LiB(C_2O_4)F_2$, LiCl, and LiBr.

* * * * *